US009161497B2

(12) United States Patent
Tseng et al.

(10) Patent No.: US 9,161,497 B2
(45) Date of Patent: Oct. 20, 2015

(54) AUTONOMOUSLY CONTROLLED GREENHOUSE CULTIVATION SYSTEM

(71) Applicant: ELECTRIC ENERGY EXPRESS CORPORATION, Hsinchu County (TW)

(72) Inventors: Ling-Yuan Tseng, Hsinchu (TW); Mingfu Chu, Taitung County (TW); Tzetzung Chen, Taipei (TW)

(73) Assignee: Electric Energy Express Corporation, Hsinchu County (TW)

( * ) Notice: Subject to any disclaimer, the term of this patent is extended or adjusted under 35 U.S.C. 154(b) by 206 days.

(21) Appl. No.: 13/936,494

(22) Filed: Jul. 8, 2013

(65) Prior Publication Data

US 2015/0007495 A1 Jan. 8, 2015

(51) Int. Cl.
*A01G 9/18* (2006.01)
*A01G 9/24* (2006.01)

(52) U.S. Cl.
CPC ... *A01G 9/18* (2013.01); *A01G 9/24* (2013.01)

(58) Field of Classification Search
CPC ......... A01G 9/14; A01G 9/246; A01G 7/045; A01G 9/24; A01G 9/18; A01G 7/02; A01G 9/26; A01G 9/247; A01G 9/245
See application file for complete search history.

(56) References Cited

U.S. PATENT DOCUMENTS 3,830,014 A * 8/1974 Baker .............................. 47/1.7
4,309,874 A * 1/1982 Jacobi et al. .................... 60/648
4,567,732 A * 2/1986 Landstrom et al. ............... 62/91
4,723,714 A * 2/1988 Lucas .......................... 239/744
4,856,227 A * 8/1989 Oglevee et al. .................. 47/17
5,005,787 A * 4/1991 Cullingford ............... 244/171.7
5,063,706 A * 11/1991 Aki et al. ........................ 43/125
5,355,618 A * 10/1994 Pedersen .......................... 47/18

(Continued)

FOREIGN PATENT DOCUMENTS

JP 11275965 A * 10/1999 ............... A01G 7/02
WO WO 2004093526 A1 * 11/2004 ............... A01G 9/24

OTHER PUBLICATIONS

Machine translation of JP 11275965 to Kawakami et al., published Oct. 1999.*

(Continued)

*Primary Examiner* — Kathleen Alker
(74) *Attorney, Agent, or Firm* — Rosenberg, Klein & Lee

(57) ABSTRACT

An autonomously controlled greenhouse cultivation system includes a fuel cell module, an environment detection and control module, and environment set-up devices. The fuel cell module includes input terminals and output terminals. After fuel and air are received through the input terminals, the output terminals supply, respectively, various environmental products, including electrical power, thermal energy, carbon dioxide, and water, which are fed to the environment detection and control module that controls the output of these environmental products and includes detection units and control units to detect and effect feedback control of illumination, temperature, humidity, carbon dioxide concentration, and water level. Each environment set-up device is arranged inside a greenhouse and is connected to the environment detection and control module to receive the environmental to set up the environment of growth in respect of illumination, temperature, humidity, carbon dioxide, and water supply of irrigation for the plants cultivated in the greenhouse.

12 Claims, 7 Drawing Sheets

(56) References Cited

U.S. PATENT DOCUMENTS

| | | | | |
|---|---|---|---|---|
| 6,205,704 | B1 * | 3/2001 | Schmitz et al. | 47/17 |
| 2003/0005626 | A1 * | 1/2003 | Yoneda et al. | 47/69 |
| 2003/0150394 | A1 * | 8/2003 | Wolfe | 119/246 |
| 2010/0031566 | A1 * | 2/2010 | Azoulay | 47/61 |
| 2011/0148124 | A1 * | 6/2011 | Soejima | 290/1 R |
| 2011/0192082 | A1 * | 8/2011 | Uchiyama | 47/66.6 |
| 2012/0276633 | A1 * | 11/2012 | Gonzalez et al. | 435/420 |
| 2012/0279121 | A1 * | 11/2012 | Van Elmpt et al. | 47/58.1 LS |
| 2014/0115958 | A1 * | 5/2014 | Helene et al. | 47/17 |
| 2014/0137468 | A1 * | 5/2014 | Ching | 47/17 |
| 2015/0089867 | A1 * | 4/2015 | Abbott et al. | 47/58.1 LS |

OTHER PUBLICATIONS

Machine translation of WO 2004093526 to Bellali, published Nov. 2004.*

* cited by examiner

AUTONOMOUSLY CONTROLLED GREENHOUSE CULTIVATION SYSTEM

BACKGROUND OF THE INVENTION

1. Field of the Invention

The present invention relates to an autonomously controlled greenhouse cultivation system, and in particular to a control and cultivation system that is applied to an enclosed or semi-enclosed greenhouse to use fuel cells to create, in a green-energy manner, various growth environments and conditions for greenhouse plants.

2. The Related Arts

In the traditional agricultures, plants are exposed to the natural environments and are thus affected by insect damage and surrounding pollutions so that the growth environments of the plants cannot be effectively controlled and are totally rely upon the natural weather. This is quite a challenge to the agricultural people. In addition, in the traditional agricultures, the growth environments of plants are not readily controllable so that plants are easily subjected to chilling injury or diseases caused by hotness. Further, a large amount of chemical fertilizer and pesticides of stronger toxicity must be commonly used in order to improve the growth speed and suppress the occurrences of diseases and pest damages, so that the plants so cultivated, after being eaten, may cause severer threatens to human health. Thus, greenhouse cultivating is now the new trend of green agriculture for it can overcome the issues of chemical fertilizers and pesticide pollutions of the traditional agriculture.

However, in the conventional greenhouse cultivation, photosynthesis of the plants carried out inside a clean greenhouse must be taken into serious consideration and mimicking of environmental factors, such as illumination, temperature, humidity, watering and irrigation, and natural change of weather, must be carefully exercised for plants in order to allow the plants to grow normally inside the greenhouse in the same as they will outdoors. For example, the photosynthesis of plant can be expressed in chemical formula as follows: $12H_2O+6CO_2 \rightarrow C_6H_{12}O_6+6O_2+6H_2O$. In other words, plants need proper amounts of water and carbon dioxide to be converted into organic carbohydrate ($C_6H_{12}O_6$), oxygen, and water through the photosynthetic reactions carried out by chlorophyll of the plants and illumination. This means the plants, even being cultivated in a greenhouse, still needs a proper amount of water supply and carbon dioxide of suitable concentration in order to allow the plants to carry out photosynthetic reactions in exactly the same way as if they were growing in the nature and thus ensuring normal growth of the plants. Further, the harvest of the plants can be increased, if the illumination time, the switching sequence, the light spectrum used (such as blue light and the likes), concentration of carbon dioxide, time period of application, and temperature control are properly adjusted. Some plants may provide an increase of at least 30% of the harvest. This is not achievable by the conventional greenhouse cultivation.

Thus, conventional greenhouse cultivation needs electricity supply from for example an electrical main or solar cells that are claimed to be "green energy" to serve as a power source for generating illumination that resembles the natural environment and to create environmental factors, such as temperature, humidity, and watering and irrigation by consuming a large amount of power from such an electricity supply to generate heat or supply and spray water or mist. This consumes a great amount of electrical power and such a consumption of electrical power is generally a heavy economic burden of operation cost for greenhouse cultivation that is operated with emphasis on green energy. Further, the conventional greenhouse must supply organic fertilizer for the growth of plants and allows the microorganism of the natural environments to naturally decompose the organic substance to generate carbon dioxide or employs a direct supply of carbon dioxide from a gas canister in order to maintain the sufficient concentration of carbon dioxide for the greenhouse plant to carry out photosynthesis. Consequently, besides supply of electrical power and illumination, the conventional greenhouse cultivation facility also needs to additionally prepare and supply environmental resources required for plant growth and photosynthesis in respect of the above described factors of temperature, humidity, water supply and irrigation, and carbon dioxide. It is thus difficult to integrate and use collectively the supply of environmental resources of illumination, temperature, humidity, water supply and irrigation, and carbon dioxide and individual investment must be done separately for the facility expense and unnecessary consumption of a large amount of electrical power. This leads to a complicated structure of the conventional greenhouse based plant cultivation facility of which the installation and cultivation costs are both high. The price of the agricultural product of greenhouse cultivation is thus excessively high, making it limited to a small group of high-price consumers and impossible to be popular for general consumers. This is a serious issue to be addressed for the greenhouse cultivation.

Prior art patent documents in this field are known, such as Taiwan Utility Model No. M442023, which discloses a plant cultivation system, Taiwan Patent No. 1365711, which discloses a solar energy based greenhouse, Taiwan Utility Model No. M423999, which relates to an automatic flower caring device, Taiwan Patent Publication No. 201309190, which discloses a green-energy water-saving planting greenhouse system, and Taiwan Patent Publication No. 201038190, which discloses a greenhouse or agricultural shed containing thin-film solar cells. These documents disclose facility that uses solar cells or storage batteries to provide primary power supply for supplying of electrical power to illumination of the greenhouse and also supply electrical power for the operation of equipment that converts electrical power to provide temperature, humidity, and water supply and irrigation. However, in the process of conversion, there is still a great amount of unnecessary electrical power is lost, so that the operation efficiency of the solar cells is undesirably reduced. In case that the supply of electrical power from these sources is insufficient, an additional supply of electrical power from for example the electrical main is required. This makes it not possible for the greenhouse cultivation to achieve the economic benefit of true greenhouse based high-quality agriculture.

Similarly, in the known techniques of the prior art patent documents and the above described conventional greenhouse cultivation system, besides the illumination equipment can be directly operated with the supply of electrical power from for example electrical main or solar cells, there is generally no way to directly handle the issue of supply of environmental resources in respect of for example temperature, humidity, water supply and irrigation, and carbon dioxide. Additional equipment and resources must be separately installed and provided for the supply of temperature, humidity, water and irrigation, and carbon dioxide. This leads to the same problems and shortcomings of complicated facility, high cultivation cost, and great loss caused by conversion of electrical power as those found in the conventional greenhouse cultivation systems.

SUMMARY OF THE INVENTION

A primary object of the present invention is to provide an autonomously controlled greenhouse cultivation system that eliminates the problems and shortcomings of the conventional greenhouse cultivation system that an electrical generation device only supplies electrical power for the operation of illumination and additional facility and resources must be separately invested and provided for supplying temperature, humidity, water and irrigation, and carbon dioxide so as to result in high costs of facility and cultivation for greenhouse cultivation.

Thus, the present invention provides an autonomously controlled greenhouse cultivation system, which comprises at least one fuel cell module, an environment detection and control module, and a plurality of environment set-up devices, wherein the fuel cell module, which is particularly a solid oxide fuel cell (SOFC), comprises a plurality of input terminals and output terminals. After fuel and air are received through the input terminals, the output terminals supply, respectively, various environmental products, including electrical power, thermal energy, carbon dioxide, and water. The environmental products are fed to the environment detection and control module. The environment detection and control module functions to control the output of these environmental products and comprises a plurality of detection units and control units to detect and effect feedback control of various environmental factors of illumination, temperature, humidity, carbon dioxide concentration, and water level and output of products. Each of the environment set-up devices is arranged inside at least one greenhouse and is connected to the environment detection and control module to receive environmental products output from the environment control module to set up the environments of growth and conditions in respect of illumination, temperature, humidity, carbon dioxide, and water supply of irrigation for the plants cultivated in the greenhouse so as to constitute a system featuring fuel cell green energy and simulation of natural environment in the greenhouse.

The efficacy of the autonomously controlled greenhouse cultivation system of the present invention is that various environmental products of electrical power, thermal energy, carbon dioxide, and water supplied from output terminals of the fuel cell module are directly fed to the environment set-up devices of the environment detection and control module without requiring conversion that causes a great loss of electrical power so as to provides environments and conditions of growth in respect of illumination, temperature, humidity, carbon dioxide, and water supply of irrigation required for cultivation of enclosed or semi-enclosed greenhouse thereby significantly reducing the installation cost and cultivation cost for greenhouse cultivation. Further, the various environmental products of 之 electrical power, thermal energy, carbon dioxide, and water supplied from the output terminals of the fuel cell module are direct products of the fuel cell module and are not ones that are obtained through conversion of a large amount of electrical power so that no useful resources are wasted. Unnecessary loss of electrical power of the fuel cell module can be minimized and the operation performance can be significantly increased to provide the best economic benefit of green energy based high-quality agricultural cultivation to greenhouse cultivation.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
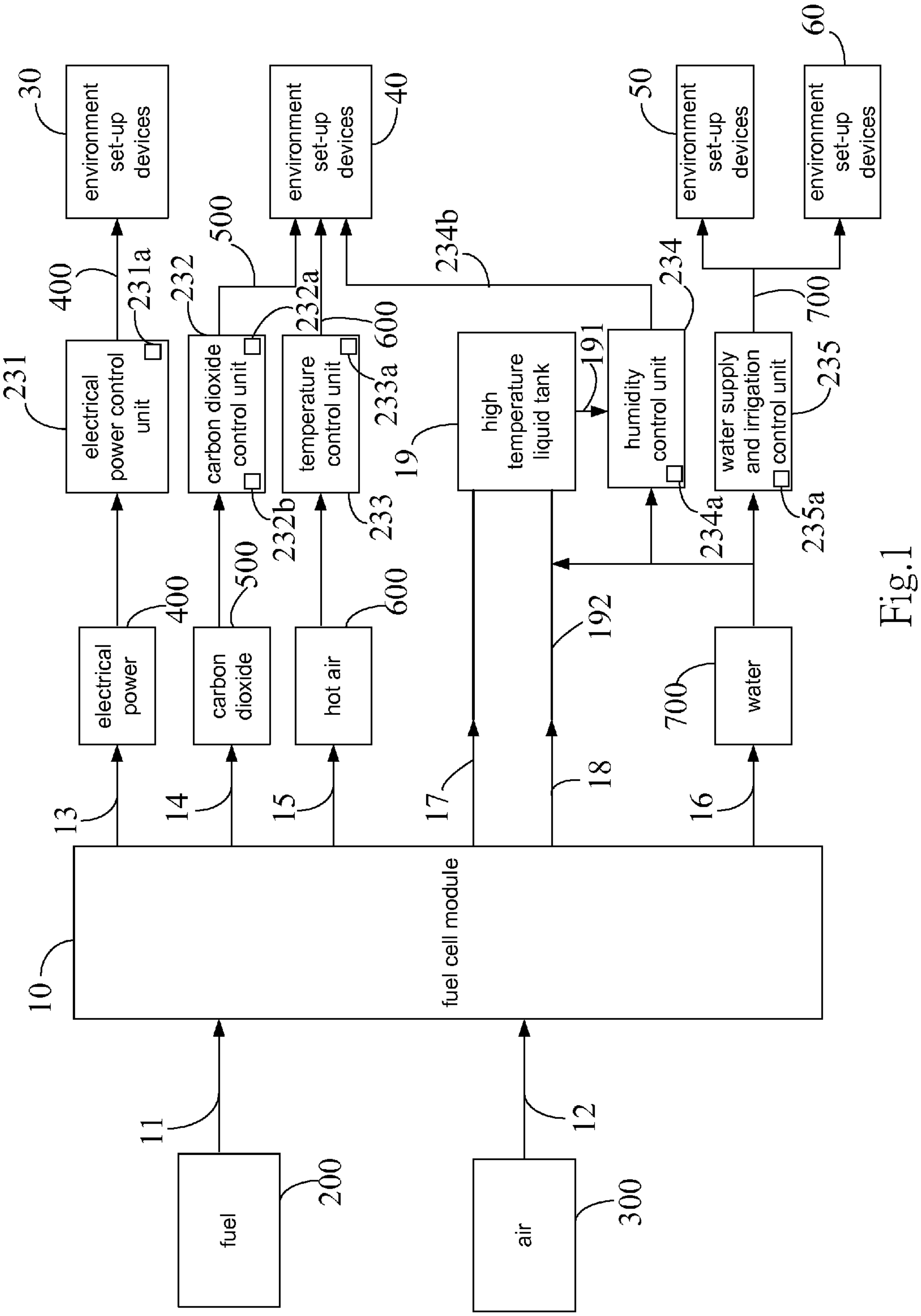
FIG. 1 is a system block diagram of an autonomously controlled greenhouse cultivation system in accordance with a first embodiment of the present invention.

With reference to the drawings and in particular to FIG. 1, an autonomously controlled greenhouse cultivation system 100 according to a first embodiment of the present invention is shown. The greenhouse cultivation system 100 comprises at least one fuel cell module 10. The fuel cell module 10 is not limited to any specific type and a BlueGen® solid oxide fuel cell (SOFC) module, which is available from Ceramic Fuel Cells Limited (CFCL), Australia, is taken as an example in the description of the present invention. The fuel cell module 10 comprises a first input terminal 11, a second input terminal 12 and a first output terminal 13, a second output terminal 14, a third output terminal 15, a fourth output terminal 16, and a pair of fifth output terminals 17, 18. The first input terminal 11 and the second input terminal 12 respectively receive input of fuel 200 and air 300. The fuel 200 can be composed of gases having high contents of carbon and hydrogen, such as natural gas containing methane, petroleum gas, coal gas, and marsh gas. The first output terminal 13, the second output terminal 14, the third output terminal 15, and the fourth output terminal 16 respectively supply outputs of various environmental products of electrical power 400, carbon dioxide 500, hot air 600, and water 700. The fifth output terminals 17, 18 supply outputs for heat exchange with water or air. The electrical power 400 can be electricity of 110V, 60 Hz alternate current with a power generation efficiency of 60%. The fifth output terminals 17, 18 are capable of heat exchange of hot water at a rate of 200 liter/day. For example, the fifth output terminals 17, 18 are respectively connected to a liquid outlet 191 and a liquid inlet 192 of a high temperature liquid tank 19 and the liquid inlet 192 is connected to the fourth output terminal 16 to receive a supply of liquid, such as water 700, for heat exchange with water 700 contained in the high temperature liquid tank 19 to achieve heating and thus generate a high temperature liquid, such as hot water. The high temperature liquid is not necessarily hot water and may be any other liquid that is useful in agriculture and thus heat exchange is applied in this way to such a liquid.

Figure 2:
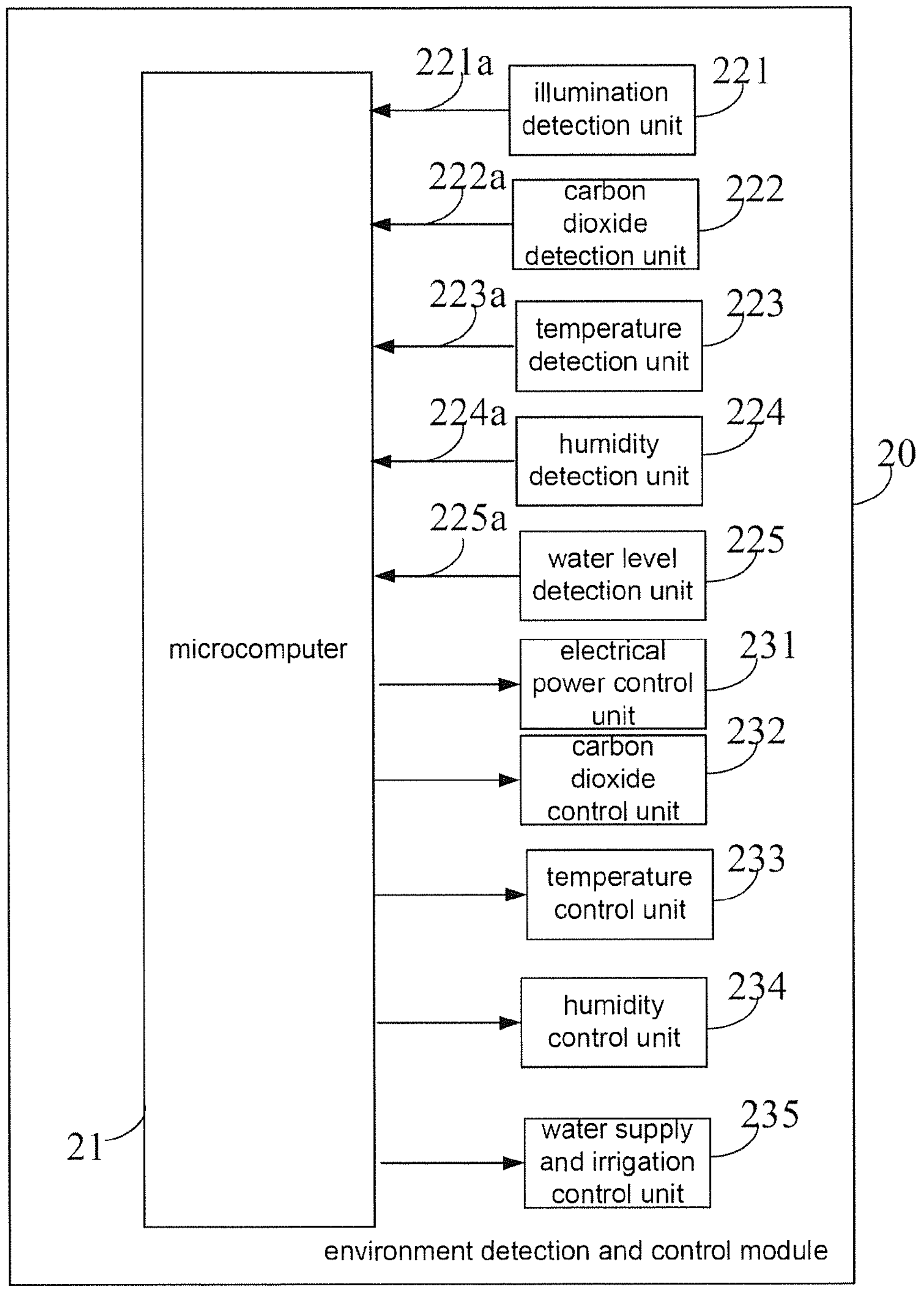
FIG. 2 is a block diagram of an environment detection and control module of the present invention.
Figure 3:
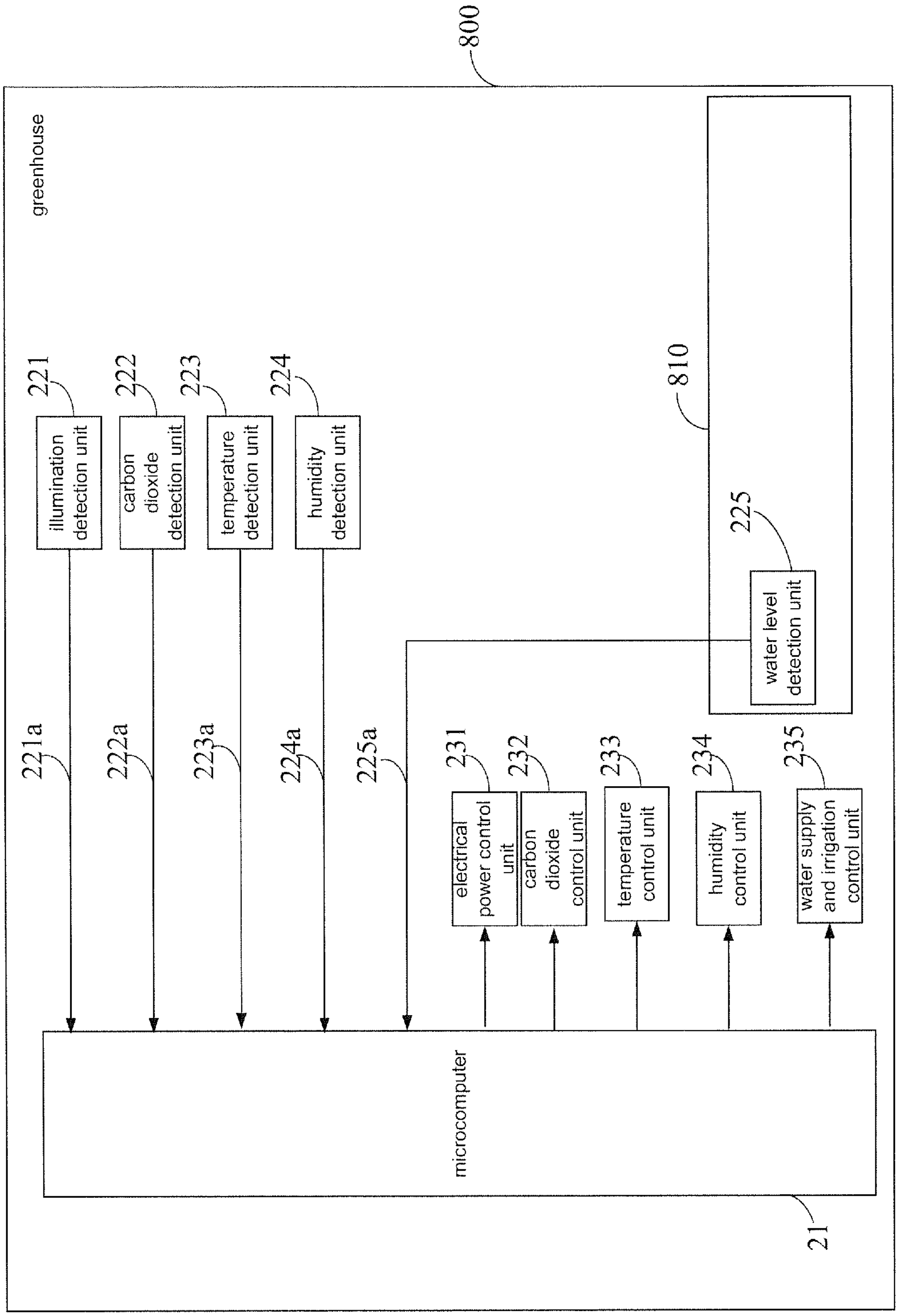
FIG. 3 is a schematic view illustrating the arrangement of various sensor units of the environment detection and control module of the present invention in a greenhouse.

Referring to FIGS. 2 and 3, at least one environment detection and control module 20, which is not limited to any specific type, comprises, among other things, at least one microcomputer 21, for example an illumination detection unit 221, a carbon dioxide detection unit 222, a temperature detection unit 223, a humidity detection unit 224, a water level detection unit 225, an electrical power control unit 231, a carbon dioxide control unit 232, a temperature control unit 233, a humidity control unit 234, and a water supply and irrigation control unit 235. The microcomputer 21 provides functions of detection and feedback control of illumination, carbon dioxide, temperature, humidity, water level and can be loaded in advance with data of environmental control parameters of greenhouse cultivation, such as illumination, carbon dioxide, temperature, humidity, and water supply and irrigation.

The illumination detection unit 221 is arranged in a greenhouse 800 (as shown in FIG. 3) to detect the brightness of illumination inside the greenhouse 800, meaning detecting brightness of illumination of daytime and nighttime of the greenhouse 800 and sending an illumination detection signal 221*a* back to the microcomputer 21 to serve as a basis by which the microcomputer 21 controls the internal brightness of illumination of the greenhouse 800. The carbon dioxide detection unit 222 is arranged in the greenhouse 800 to detect the concentration of carbon dioxide 500 inside the greenhouse 800 and send a carbon dioxide detection signal 222*a* back to the microcomputer 21 to provide a basis by which the microcomputer 21 controls the internal concentration of carbon dioxide 500 of the greenhouse 800.

The temperature detection unit 223 is arranged in the greenhouse 800 to detect the internal temperature of the greenhouse 800 and send a temperature detection signal 223*a* back to the microcomputer 21 to provide a basis by which the microcomputer 21 controls the internal temperature of the greenhouse 800. The humidity detection unit 224 is arranged in the greenhouse 800 to detect the internal humidity of the greenhouse 800 and send a humidity detection signal 224*a* back to the microcomputer 21 to provide a basis by which the microcomputer 21 controls the internal humidity of the greenhouse 800.

The water level detection unit 225 is arranged in a cultivation container 810 set in the greenhouse 800 to detect the irrigation water level inside the cultivation container 810 and sends a water level detection signal 225*a* back to the microcomputer 21 to provide a basis by which the microcomputer 21 controls the irrigation water level of the cultivation container 810 set inside the greenhouse 800.

The electrical power control unit 231 is connected to the microcomputer 21 and the first output terminal 13 of the fuel cell module 10 to connect with and receive the output of electrical power 400 from the first output terminal 13 of the fuel cell module 10 and to allow the microcomputer 21 to control the condition of output of electrical power 400 from the electrical power control unit 231 according to the illumination detection signal 221*a* of the illumination detection unit 221. The electrical power control unit 231 may include an electrical switch 231*a* that controls supply or cut-off of the electrical power 400 and the electrical current and power supplied therefrom.

The carbon dioxide control unit 232 is connected to the microcomputer 21 and the second output terminal 14 of the fuel cell module 10 to connect with and receive the output of carbon dioxide 500 from the second output terminal 14 of the fuel cell module 10 and to allow the microcomputer 21 to control the carbon dioxide 500 to supply or not from the carbon dioxide control unit 232 according to the carbon dioxide detection signal 222*a* of the carbon dioxide detection unit 222. The carbon dioxide control unit 232 may include an electromagnetic valve 232*a* and a fan 232*b* to control supply or cut-off the carbon dioxide 500.

The temperature control unit 233 is connected to the microcomputer 21 and the third output terminal 15 of the fuel cell module 10 to connect with and receive the output of hot air 600 from the third output terminal 15 of the fuel cell module 10 and to allow the microcomputer 21 to control the hot air stream 600 to supply or not from the temperature control unit 233 according to the temperature detection signal 223*a* of the temperature detection unit 223. The temperature control unit 233 may include an electromagnetic valve 233*a* to control supply or cut-off of the hot air stream 600.

The humidity control unit 234 is connected to the microcomputer 21 and the high temperature liquid tank 19 connected to the fourth output terminal 16 and the fifth output terminals 17, 18 of the fuel cell module 10 to connect with and receive the output of water 700 from the fourth output terminal 16 of the fuel cell module 10 and the output of hot water or high temperature liquid from the high temperature liquid tank 19 connected to the fifth output terminals 17, 18 and to allow the microcomputer 21 to control steam 234*b* to supply or not from the temperature control unit 234 according to the humidity detection signal 224*a* of the humidity detection unit 224. The humidity control unit 234 may include a steam generator 234*a* to control supply or cut-off of the steam 234*b*.

The water supply and irrigation control unit 235 is connected to the microcomputer 21 and the fourth output terminal 14 of the fuel cell module 10 to connect with and receive the output of water 700 from the fourth output terminal 16 of the fuel cell module 10 and to allow the microcomputer 21 to control the water 700 to supply or not from the water supply and irrigation control unit 235 according to the water level detection signal 225*a* of the water level detection unit 225. The water supply and irrigation control unit 235 may include an electromagnetic valve 235*a* to control supply or cut-off of the water 700 is connected to.

A plurality of environment set-up devices 30, 40, 50, 60 is separately arranged in the greenhouse 800. The environment set-up device 30 is arranged above the cultivation container 810 in the greenhouse 800. The environment set-up device 30 comprises a lighting assembly, which comprises a plurality of lighting devices 31. The environment set-up device 30 is connected to the electrical power control unit 231 to receive the output of electrical power 400 from the electrical power control unit 231 so that the environment set-up device 30 may provide an environment of lighting illumination inside the greenhouse 800.

The environment set-up device 40 is arranged above the cultivation container 810 in the greenhouse 800. The environment set-up device 40 is connected to the carbon dioxide control unit 232, the temperature control unit 233, and the humidity control unit 234 to receive carbon dioxide 500, hot air stream 600, and steam 234*b*. The environment set-up device 40 comprises a hollow tube and a plurality of spraying nozzles 41 to eject carbon dioxide 500, hot air stream 600, or steam 234*b* through the spraying nozzles 41 so that the environment set-up device 40 provides an environment of carbon dioxide 500, temperature, and humidity inside the greenhouse 800.

The environment set-up device 50 is connected to the water supply and irrigation control unit 235 to receive water 700. The environment set-up device 50 comprises a water sprinkler module, which comprises a plurality of water sprinklers 51 to sprinkle water 700 through the water sprinklers 51 so that the environment set-up device 50 provides an environment of water supply of irrigation and humidity inside the cultivation container 810 of the greenhouse 800.

The environment set-up device 60 is arranged in the cultivation container 810 of the greenhouse 800. The environment set-up device 60 is connected to the water supply and irrigation control unit 235 to receive water 700. The environment set-up device 60 comprises an irrigation water pipe to provide an environment of supply water of irrigation and water level control inside, the cultivation container 810.

The fuel cell module 10 can be used as a single one in FIG. 1 and may alternatively used in multiplicity by connecting the multiple fuel cell modules 10 in series or in parallel according to the size and power consumption of the greenhouse 800, in order to upgrade the power of the greenhouse 800.

Figure 4:
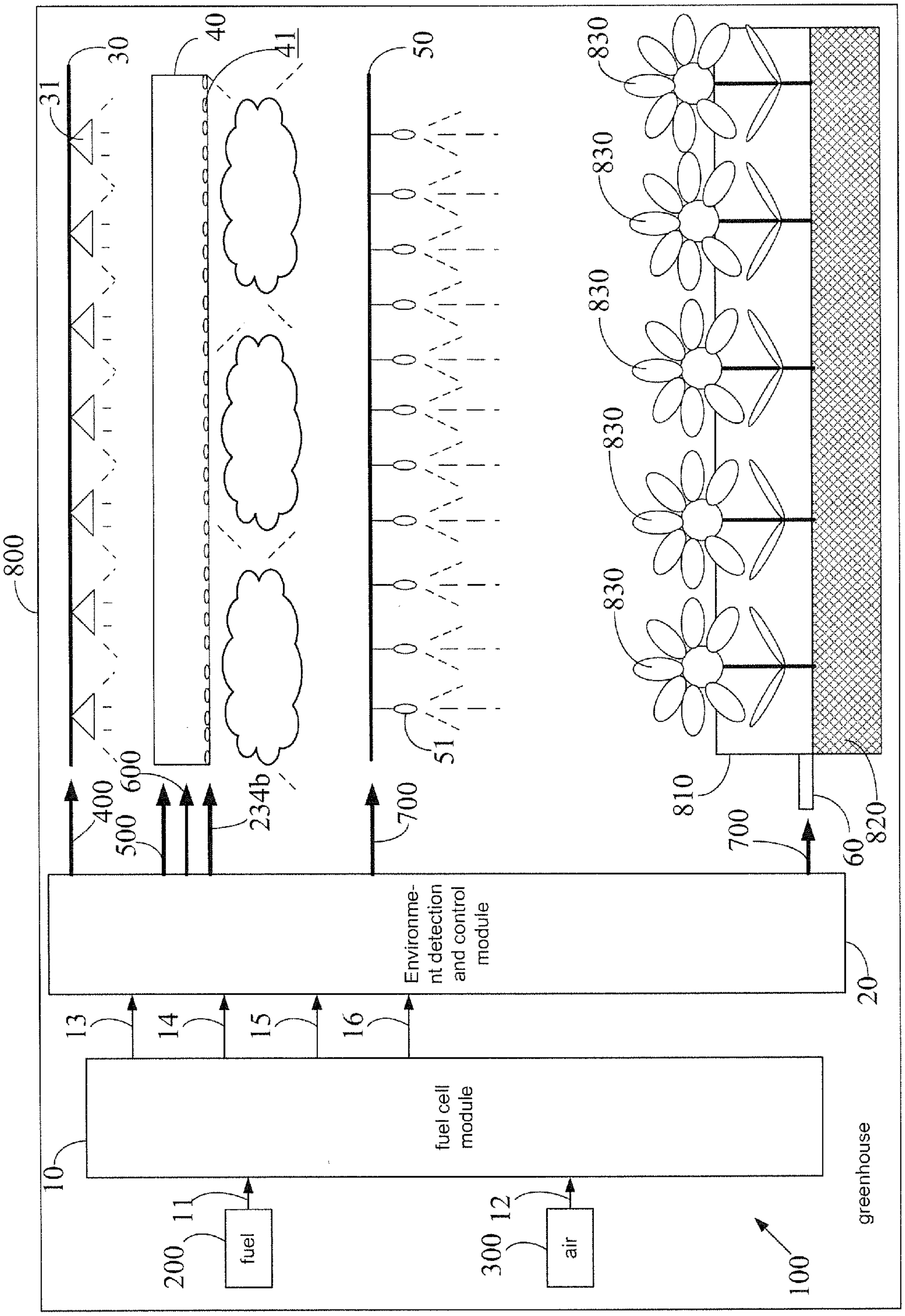
FIG. 4 is a schematic view illustrating a preferred application of the autonomously controlled greenhouse cultivation system according to the present invention.

As shown in FIG. 4, a preferred application of the greenhouse cultivation system 100 according to the present invention is shown, wherein soil 820 is shown contained in the cultivation container 810 of the greenhouse 800. A plurality of cultivation plants 830 is grown in the soil 820. The cultivation plants 830 can be any edible vegetables or hydroponic plants. With the above described environment set-up devices 30, 40, 50, 60 to respectively provide the desired environmental factors of illumination, carbon dioxide 500, temperature, humidity, and water supply of irrigation for the growth of the cultivation plants 830, the cultivation plants 830 are provided with the optimum environmental conditions for smooth growth.

Figure 5:
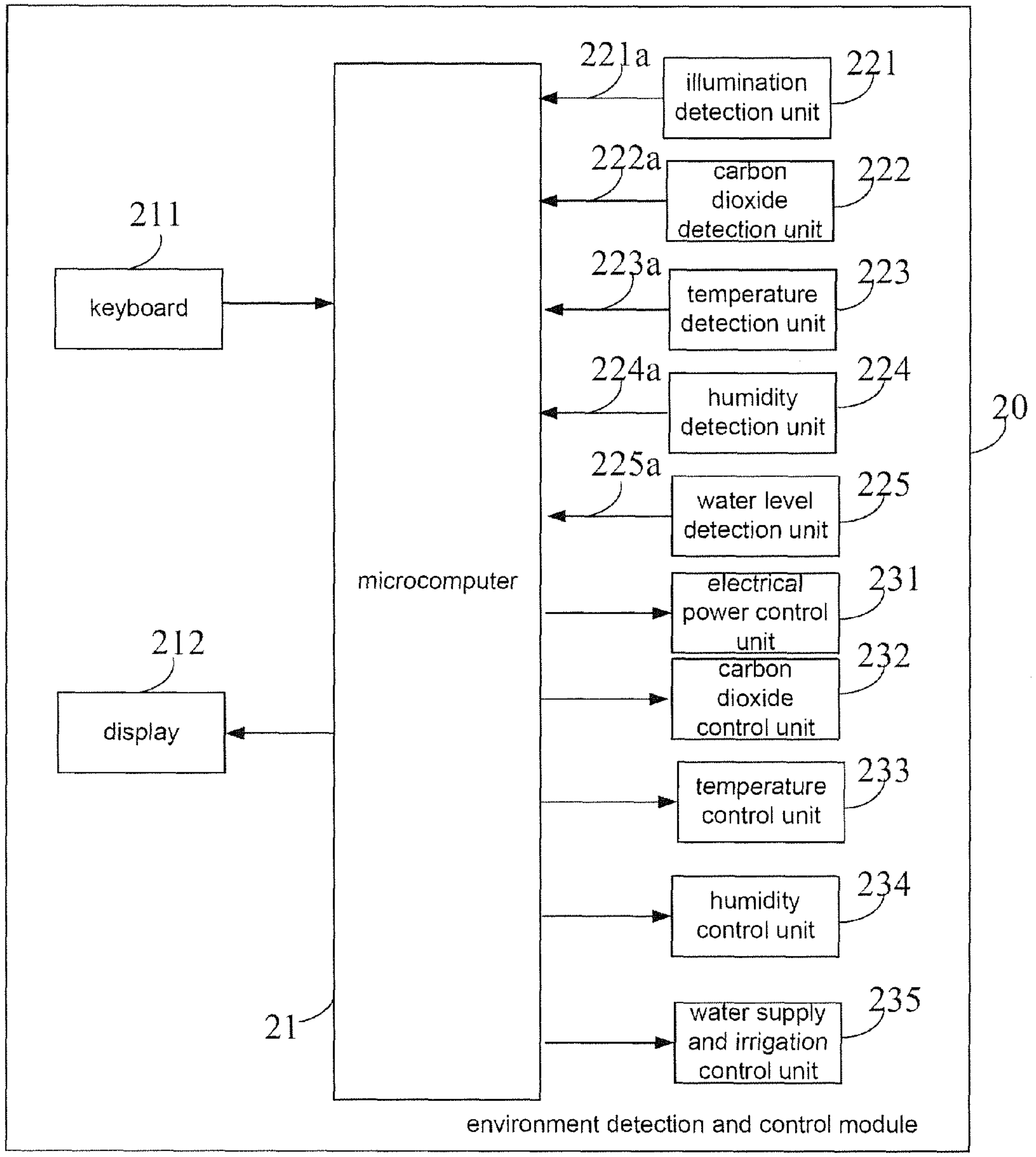
FIG. 5 is a schematic view illustrating an autonomously controlled greenhouse cultivation system in accordance with a second embodiment of the present invention.

Referring to FIG. 5, a greenhouse cultivation system 100 according to a second embodiment of the present invention is shown, wherein the microcomputer 21 of the environment detection and control module 20 is shown connected to a keyboard 211 and a display 212. The microcomputer 21 is loaded, in advance, a plurality of environmental control factors for various cultivation plants 830, such as environmental control factors for cultivation plants 830 of Bok Coy, Chinese cabbage, and lettuce, whereby a user may uses the keyboard 211 to perform an input operation for selecting environmental control factors corresponding to the type of the cultivation plants 830 and the display 212 may display the operation and the information of selection so that environmental control factors of illumination, carbon dioxide 500, temperature, humidity, and water supply of irrigation can be controlled for individual cultivation plant 830.

Figure 6:
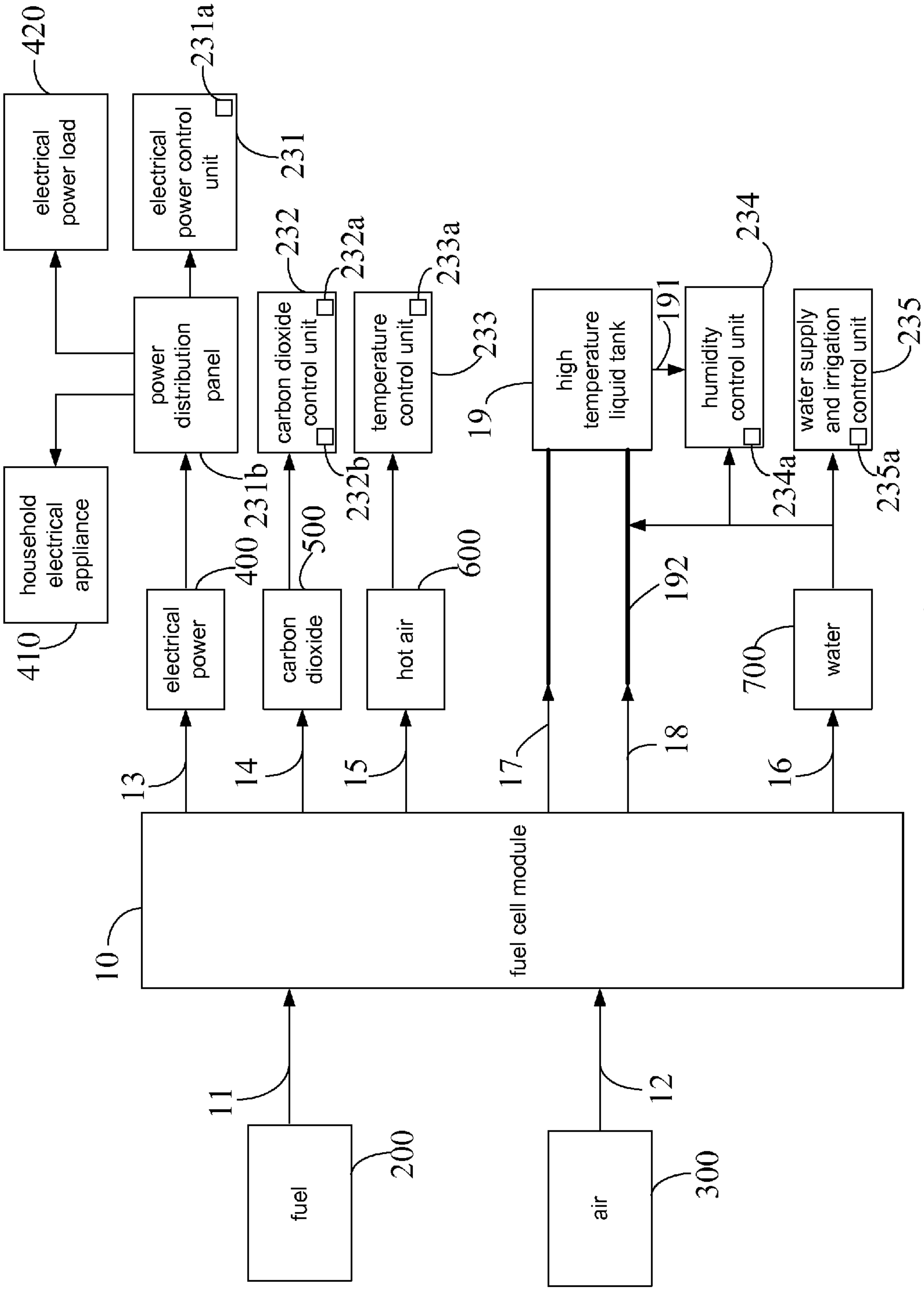
FIG. 6 is a schematic view illustrating an autonomously controlled greenhouse cultivation system in accordance with a third embodiment of the present invention.

Referring to FIG. 6, a greenhouse cultivation system 100 according to a third embodiment of the present invention is shown, wherein at least one power distribution panel **231*b* is connected between the first output terminal 13 of the fuel cell module 10 and the electrical power control unit 231 of the environment detection and control module 20. The power distribution panel 231*b* functions to provide extra electrical power 400 supplied from the first output terminal 13 to a household electrical appliance 410 and an electrical power load 420**.

Figure 7:
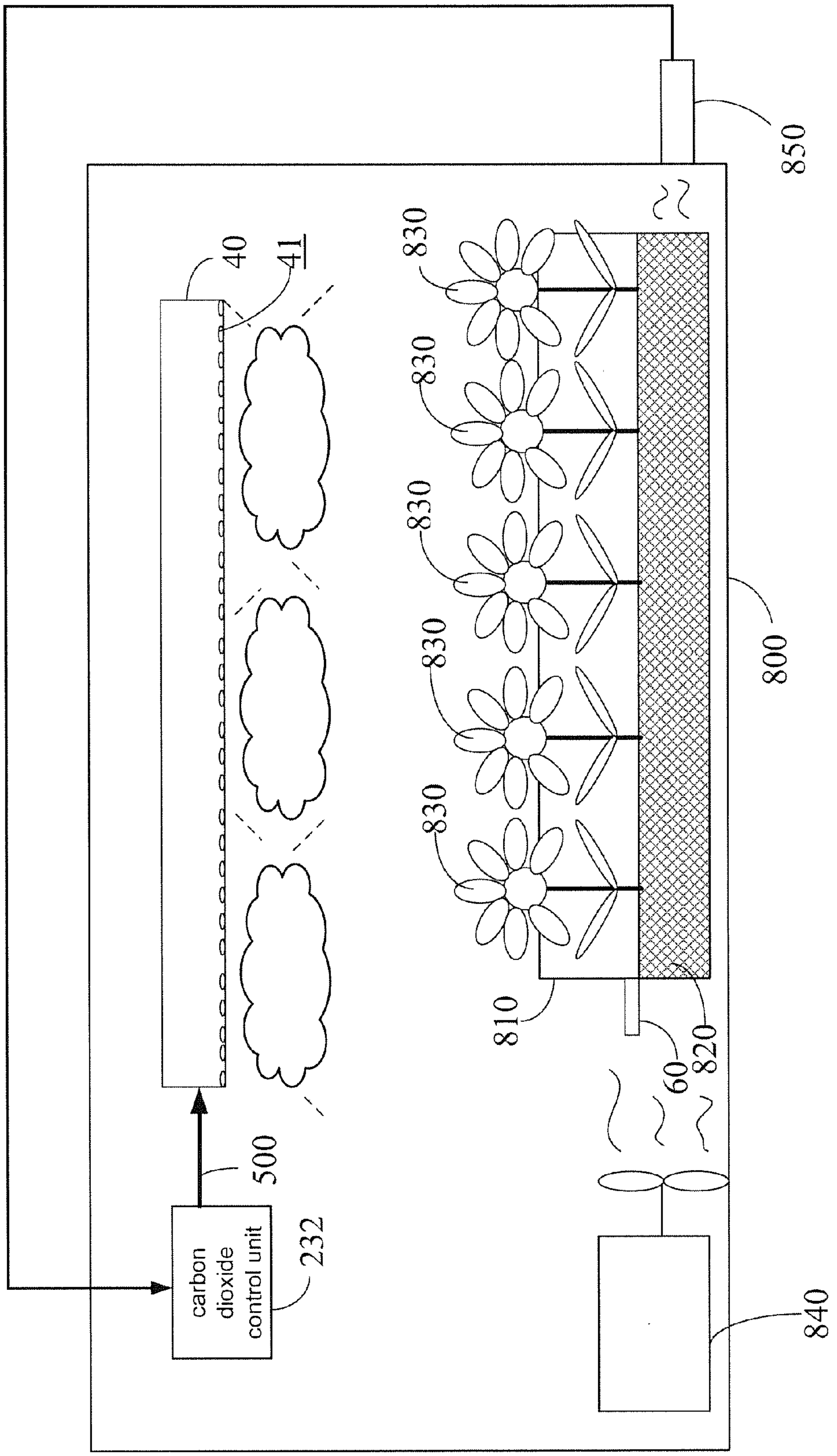
FIG. 7 is a schematic view illustrating an autonomously controlled greenhouse cultivation system in accordance with a fourth embodiment of the present invention.

Referring to FIG. 7, a greenhouse cultivation system 100 according to a fourth embodiment of the present invention is shown, wherein at least one fan 840 and a carbon dioxide recovery circulation tube 850 are respectively provided at opposite sides of the bottom of the greenhouse 800. The carbon dioxide recovery circulation tube 850 is connected to the carbon dioxide control unit 232 and the fan 840 blows carbon dioxide 500 deposited on the bottom of the greenhouse 800 in a direction toward the carbon dioxide recovery circulation tube 850 arranged at the other side so that carbon dioxide 500 can be circulated and repeatedly used.

Although FIGS. 4-7 illustrate an application of the autonomously controlled greenhouse cultivation system 100 in a greenhouse 800, wherein an environmental set up and control arrangement in which a single level of environment set-up devices 30, 40, 50, and 60 are controlled by the fuel cell module 10 and the environment detection and control module 20 to perform or control illumination, carbon dioxide, temperature, humidity, and water supply and irrigation for cultivation plants 830 of a single cultivation container 810. It is also feasible to provide an alternative application to a multi-level environmental set up and control arrangement in which multiple vertically-arranged levels of environment set-up devices 30, 40, 50, and 60 are controlled by multiple fuel cell modules 10 and multiple environment detection and control modules 20 to perform or control illumination, carbon dioxide, temperature, humidity, and water supply and irrigation for cultivation plants 830 of multiple vertically-arranged cultivation containers 810.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An autonomously controlled greenhouse cultivation system, comprising:

at least one fuel cell module, which comprises a first input terminal, a second input terminal and a first output terminal, a second output terminal, a third output terminal, and a fourth output terminal, the first input terminal and the second input terminal respectively receiving inputs of fuel and air, the first output terminal, the second output terminal, the third output terminal, and the fourth output terminal respectively supplying electrical power, carbon dioxide, hot air, and water; wherein the at least one fuel cell module includes a pair of fifth output terminals, the fifth output terminals being respectively connected to a liquid outlet and a liquid inlet of a high temperature liquid tank, the liquid inlet being connected to the fourth output terminal of the at least one fuel cell module to receive an input of liquid and to carry out heat exchange with liquid contained in the high temperature liquid tank so as to generate a high temperature liquid;

at least one environment detection and control module, which comprises at least one microcomputer, an illumination detection unit, a carbon dioxide detection unit, a temperature detection unit, a humidity detection unit, a water level detection unit, an electrical power control unit, a carbon dioxide control unit, a temperature control unit, a humidity control unit, and a water supply and irrigation control unit, the microcomputer having functions of detection of illumination, carbon dioxide, temperature, humidity, water level and feedback control, the illumination detection unit, the carbon dioxide detection unit, the temperature detection unit, the humidity detection unit being arranged in a greenhouse and the water level detection unit being arranged in a cultivation container set in the greenhouse to respectively detect the conditions of illumination, carbon dioxide, temperature, humidity, and water level of irrigation water inside the greenhouse and to respectively generate an illumination detection signal, a carbon dioxide detection signal, a temperature detection signal, a humidity detection signal, and a water level detection signal provided to the microcomputer to provide bases by which illumination, carbon dioxide, temperature, humidity, and water level of irrigation water of the greenhouse are controlled, the electrical power control unit, the carbon dioxide control unit, the temperature control unit, the humidity control unit, and the water supply and irrigation control unit being respectively connected to the microcomputer and the first output terminal, the second output terminal, the third output terminal, the fourth output terminal of the at least one fuel cell module to be controlled by the microcomputer to supply electrical power, carbon dioxide, hot air, steam, and water; and a plurality of environment set-up devices, which is arranged in the greenhouse and is respectively connected to the electrical power control unit, the carbon dioxide control unit, the temperature control unit, the humidity control unit, and the water supply and irrigation control unit of the at least one environment detection and control module to respectively set up environmental factors of illumination, carbon dioxide, temperature, humidity, and water supply of irrigation for cultivation plants of the cultivation container set in the greenhouse.

2. The autonomously controlled greenhouse cultivation system as claimed in claim 1, wherein the microcomputer of the environment detection and control module is connected to a keyboard and a display.

3. The autonomously controlled greenhouse cultivation system claimed in claim 1, wherein the electrical power control unit of the at least one environment detection and control module includes an electrical switch.

4. The autonomously controlled greenhouse cultivation system as claimed in claim 1, wherein the carbon dioxide control unit of the at least one environment detection and control module includes an electromagnetic valve and a fan.

5. The autonomously controlled greenhouse cultivation system as claimed in claim 1, wherein the temperature control unit of the at least one environment detection and control module includes an electromagnetic valve.

6. The autonomously controlled greenhouse cultivation system as claimed in claim 1, wherein the humidity control unit of the at least one environment detection and control module includes a steam generator.

7. The autonomously controlled greenhouse cultivation system as claimed in claim 1, wherein the water supply and irrigation control unit of the at least one environment detection and control module includes an electromagnetic valve.

8. The autonomously controlled greenhouse cultivation system as claimed in claim 1, wherein the environment set-up devices comprise a lighting assembly, which comprises a plurality of lighting devices.

9. The autonomously controlled greenhouse cultivation system as claimed in claim 1, wherein the environment set-up devices comprise a hollow tube and a plurality of spraying nozzles so that carbon dioxide, hot air stream, or steam can be ejected through the spraying nozzles.

10. The autonomously controlled greenhouse cultivation system as claimed in claim 1, wherein the environment set-up devices comprise a water sprinkler module, which comprises a plurality of water sprinklers, so that water is sprinkled through the water sprinklers to allow the environment set-up devices to provide an environment of water irrigation and humidity inside the cultivation container of the greenhouse.

11. The autonomously controlled greenhouse cultivation system as claimed in claim 1, wherein the environment set-up devices comprise an irrigation water pipe to provide an environment of water irrigation and water level control in the cultivation container.

12. The autonomously controlled greenhouse cultivation system as claimed in claim 1, wherein at least one power distribution panel is connected between the first output terminal of the fuel cell module and the electrical power control unit of the environment detection and control module.

* * * * *